Patented June 7, 1932

1,862,448

UNITED STATES PATENT OFFICE

WALTER E. WILLETT, OF CORTLAND, NEW YORK

LITHIC COMPOSITION

No Drawing.   Application filed February 17, 1931.   Serial No. 516,527.

This invention relates to the lithic composition of matter capable of producing a product of synthetic flint and it consists in the novel aggregate and steps hereinafter described and claimed.

In the composition the following materials are commingled substantially in the proportions stated:

|  | Per cent |
|---|---|
| Crushed carbon (and/or coke) | 64 |
| Cement | 30 |
| Lime | 1½ |
| Soap powder | 2 |
| Alum | 1½ |
| Sodium thiosulphate | 1 |

I use a form of coke of flint like structure that runs at least 84 percent pure carbon. This ingredient is what is termed—carbon. Such a coke is that manufactured by Semet-Solvay Company and a recent analysis shows,

|  | Per cent |
|---|---|
| Volatile matter | 1.65 |
| Fixed carbon | 90.15 |
| Ash | 8.20 |
| Sulphur | .66 |

This type of coke is of such hardness that it will cut glass in a manner similar to a diamond and therein differs from the usual type of coke which is of rather soft nature and will not even scratch glass.

The amount of sodium thiosulphate—a salt of thiosulphuric acid, sometimes, called hyposulphite—, and the amount of alum will depend on the character and analysis of the water used, such water varies in different locations. If the soap powder is in a concentrated form the percentage would be changed correspondingly.

In the process of compounding, the soap, lime, alum, and sodium thiosulphate in their respective proportions are thoroughly commingled, preferably in a ball grinding mill, and a quantity of this dry compound is added in the proportion stated or varied to the amount of crushed or granulated carbon and cement that is to form the batch or the amount to be mixed, depending on the particular work at hand and requirements necessary.

The process of mixing is to use an open drum mixer placing therein the carbon, cement, and a portion of the ready compounded soap, lime, alum, and sodium thiosulphate, the combined dry ingredients are then thoroughly commingled after which sufficient water is added to make a plastic mass, the mixing is then continued until the soluble portions are dissolved and thoroughly blended, after which it is either placed in molds or laid as the work requires and allowed to set by chemical reaction.

The resulting stone-like product possesses the following characteristic qualities:

First, a dense homogeneous mass to the extent of being absolutely water resisting.

Second, the crushing strength of the product is in excess of four thousand pounds per square inch in twenty-one days.

Third, the product possesses resiliency to withstand continued concussions without crumbling or dusting.

Fourth, the product possesses elasticity to withstand a bending moment far in excess of the usual reinforced concrete unit.

It is necessary to have soft water in order to thoroughly dissolve the soluble dry ingredients while in the process of mixing, the character of the water may require slight change in the proportion of the sodium thiosulphate.

The carbon or coke used is hard and abrasive similar to crushed flint, sharp and abrasive enough to cut glass in a manner similar to a diamond which is a crystal carbon. The coke used is therefore termed "glass-hard coke".

I claim:

1. A lithic composition aggregate including crushed glass-hard coke, cement, lime, soap powder, alum, and sodium thiosulphate.

2. A lithic composition aggregate including the following ingredients in substantially the proportions stated:

| | Per cent |
|---|---|
| Crushed glass-hard coke | 64 |
| Cement | 30 |
| Lime | 1½ |
| Soap powder | 2 |
| Alum | 1½ |
| Sodium thiosulphate | 1 |

In testimony whereof I affix my signature.
WALTER E. WILLETT.